(No Model.)
G. A. RUNG.
PNEUMATIC SPEED INDICATOR.
No. 336,069. Patented Feb. 9, 1886.
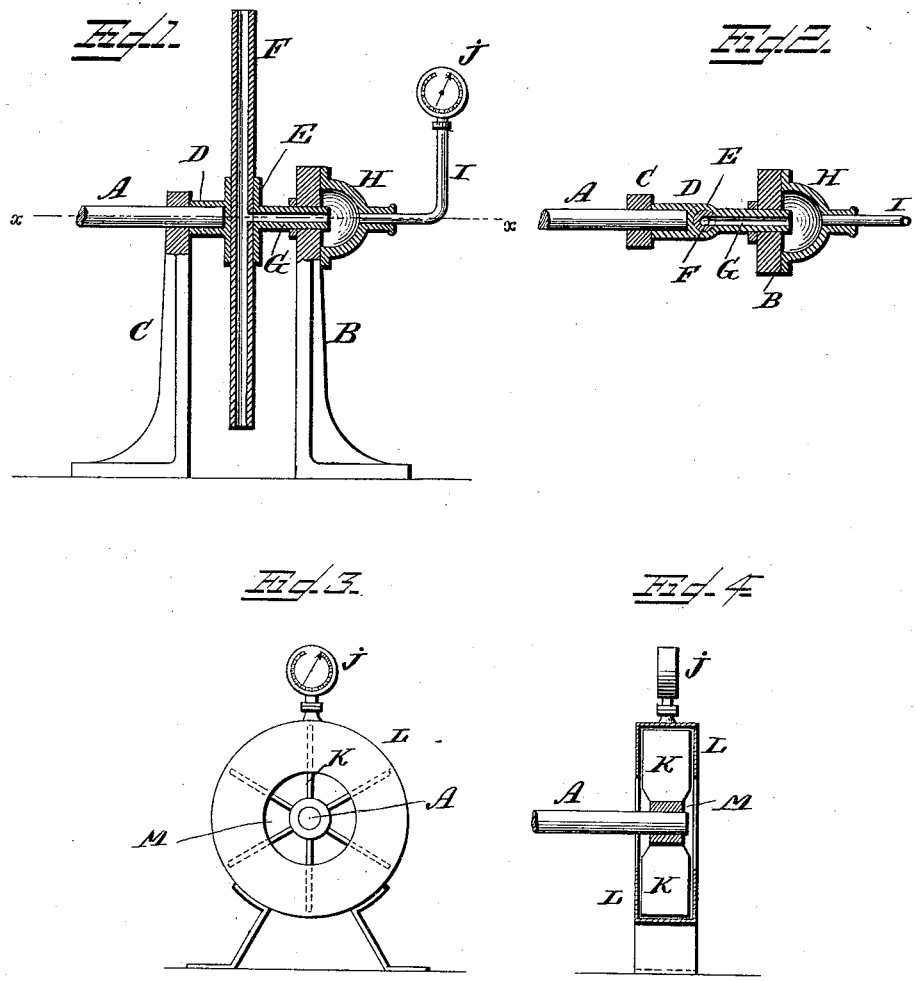
WITNESSES
George Adolph Rung
INVENTOR,
By Louis Bagger & Co.
Attorney

UNITED STATES PATENT OFFICE.

GEORG ADOLPH RUNG, OF COPENHAGEN, DENMARK.

PNEUMATIC SPEED-INDICATOR.

SPECIFICATION forming part of Letters Patent No. 336,069, dated February 9, 1886.

Application filed October 30, 1885. Serial No. 181,366. (No model.)

*To all whom it may concern:*

Be it known that I, GEORG ADOLPH RUNG, a subject of the King of Denmark, residing at Copenhagen, in the Kingdom of Denmark, have invented a certain new and useful Improvement in Pneumatic Speed-Indicators; and I do hereby declare the following to be a full, clear, and exact description of the invention, such as will enable others skilled in the art to which it appertains to make and use the same, reference being had to the accompanying drawings, which form a part of this specification.

This invention has relation to devices for indicating the speed of a revolving shaft, and is applicable to all kinds of machinery where it is desired to measure the exact speed with which the shaft revolves.

The object of my invention is twofold—viz., first, to make it possible to register the speed with absolute certainty and accuracy; and, second, to dispense with intermeshing gear-wheels, trains of gear-wheels, or similar appliances, which have heretofore been used for this purpose, but which necessarily involve a great deal of friction, and consequently by increasing the resistance to a greater or less extent retard the revolution of the shaft the speed of which is to be measured.

To this end my invention consists in the pneumatic speed-indicating device which will be hereinafter more fully described and claimed.

There are several methods of carrying out my invention, and in the accompanying sheet of drawings I have illustrated two of these, which may either be used singly or in conjunction with each other. I would have it understood, however, that I do not desire to limit myself to the specific construction shown in these two examples, as this construction may be varied or modified in its details in a great number of ways, which will readily suggest themselves to those experienced in the art to which my invention relates without deviating from the spirit of my invention.

In the accompanying drawings, Figure 1 represents a vertical sectional view of my pneumatic speed-indicator adapted to indicate the speed at which the shaft revolves by creating a vacuum or partial vacuum in a suitably-constructed gage-glass. Fig. 2 is a horizontal sectional view on line $x\ x$. Fig. 3 is a longitudinal vertical section of my pneumatic speed-indicator as adapted to indicate the speed at which the shaft revolves by the compression of air in the gage-glass; and Fig. 4 is a vertical cross-section at right angles to the section shown in Fig. 3.

Similar letters of reference indicate corresponding parts in all the figures.

In the accompanying drawings, A denotes the revolving shaft the speed of which is to be measured or indicated.

C denotes one of the standards or uprights in which one end of the said shaft is journaled, and D is a bushing or sleeve, which is fixed firmly upon the projecting inner end of the shaft, and has attached to it a tubular cross-head, E, into which is inserted a tube, F, of suitable length and material, open at both ends, as shown in the drawings. This tube or pipe is so arranged in the tubular cross-head E as to project an equal distance to both sides of the axis of the shaft, or, in other words, it forms tubular arms of even length radiating from the axial line of the shaft in opposite directions and in a line with each other. The middle of this tube communicates by the tubular shaft G, which is journaled in the standard B, with a hemispherical cap or hood, H, which is bolted air-tight upon the outside of the standard or journal bearing B, and which in turn communicates by the pipe I with the manometer or vacuum-gage J, which latter may be of any suitable construction.

It will be seen that as the shaft A revolves the air contained in the tube or pipe F is expelled by the centrifugal force, thus creating a vacuum or partial vacuum in the middle part of it, which in turn creates a suction through the tubular shaft G, hood H, and pipe I, and the manometer or gage J will indicate the extent or measure of this vacuum. The faster the shaft revolves the greater will be the vacuum created in the gage J, and by having this gage properly marked a glance at it will show the exact number of revolutions made by the shaft in a given period. It will readily be seen that the reverse principle may be employed for the same purpose—viz, the compression of air in the gage or manometer instead of its exhaustion. For such a purpose I construct the device as shown in Figs. 3 and 4, in which one end of the shaft is provided with radial fans or wings K, which revolve inside of a casing, L, having central apertures, M, for the inlet of air. In other words, this part of the device is simply a fan-blower of the ordinary and well-known construction. The hood or casing which envelopes the fan is connected to the manometer or gage J by an air-tight pipe, and as the wings revolve the air is forced and compressed into the manometer or gage, which will indicate the extent of the compression. The faster the shaft revolves the greater will be the density of the air in the gage glass, and by properly marking or scaling this a glance will show the exact number of revolutions made by the shaft within a given period in like manner as the gage in Fig. 1. Where great accuracy is of importance—as, for example, in measuring the speed of rapidly-revolving shafts in scientific instruments—I prefer to combine both these constructions in a single instrument, so that the speed of the shaft will be indicated both by the exhaustion of air in one gage and by its condensation in the other. If the two gages should fail to register alike, then the exact speed of the revolutions of the shaft would be indicated by striking the mean between the two gages. Thus it will be seen that the forms of construction shown in Figs. 1 and 2 and 3 and 4, respectively, are adapted to operate in conjunction with one another, or auxiliary to one another, where great accuracy is desirable. For ordinary purposes, however, either one of these constructions will be found to answer the purpose, and on account of its simplicity I prefer to use the construction illustrated in Figs. 1 and 2. Instead of using a single tube or pipe, as shown in the drawings, a number of them may be used arranged radially around the shaft like the spokes in a wheel, or two circular disks may be mounted centrally upon the shaft, connected by transverse barrels radiating from the center of the shaft, so as to form a series of radial compartments connected through the central tube with the manometer. As these disks and the inclosed compartments revolve the air will be expelled from the latter in precisely the same manner as from the pipe or tube shown on the drawings, and the manometer or gage will indicate the vacuum created thereby.

Having thus described my invention, I claim and desire to secure by Letters Patent of the United States—

A pneumatic device or speed-indicator for measuring the speed of revolving shafts, consisting, essentially, of one or more tubes fixed transversely upon the shaft, and radiating in a plane at right angles to the same, in combination with a manometer or vacuum-gage adapted to register the vacuum created within the said tube or tubes by the centrifugal force, substantially as and for the purpose set forth.

In testimony whereof I have hereto affixed my signature in presence of two witnesses.

GEORG ADOLPH RUNG.

Witnesses:
FREDERIK WOLFF,
EMIL HANSEN.